US012794320B2

(12) United States Patent
Lee

(10) Patent No.: US 12,794,320 B2
(45) Date of Patent: Nov. 10, 2026

(54) NON-CONTACT ROTARY TRANSFORMER AND MOTOR COMPRISING SAME

(71) Applicant: INTELLECTUAL DISCOVERY CO., LTD., Seoul (KR)

(72) Inventor: Joo Yeol Lee, Gunpo-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 140 days.

(21) Appl. No.: 18/730,775

(22) PCT Filed: Sep. 20, 2022

(86) PCT No.: PCT/KR2022/014001
§ 371 (c)(1),
(2) Date: Apr. 8, 2025

(87) PCT Pub. No.: WO2023/146056
PCT Pub. Date: Aug. 3, 2023

(65) Prior Publication Data
US 2025/0392196 A1 Dec. 25, 2025

(30) Foreign Application Priority Data
Jan. 27, 2022 (KR) ........................ 10-2022-0012727

(51) Int. Cl.
*H02K 11/04* (2016.01)
*H02K 5/04* (2006.01)
(Continued)

(52) U.S. Cl.
CPC ............... *H02K 11/04* (2013.01); *H02K 5/04* (2013.01); *H02K 7/003* (2013.01); *H02K 7/08* (2013.01)

(58) Field of Classification Search
CPC .......... H02K 11/04; H02K 5/04; H02K 7/003; H02K 7/08
See application file for complete search history.

(56) References Cited

U.S. PATENT DOCUMENTS 5,572,178 A * 11/1996 Becker .................... H01F 38/18 336/120
2003/0173936 A1 9/2003 Sezgin
(Continued)

FOREIGN PATENT DOCUMENTS

CA 2898137 * 11/2022 ......... H02K 11/0094
EP 1361588 11/2003
(Continued)

OTHER PUBLICATIONS

Office Action for EP 22924311.8 by European Patent Office dated Nov. 13, 2025.
(Continued)

*Primary Examiner* — Terrance L Kenerly
(74) *Attorney, Agent, or Firm* — BROADVIEW IP LAW, PC

(57) ABSTRACT

Disclosed are a non-contact rotary transformer and a motor comprising same. A non-contact rotary transformer according to the present invention is a device for connecting a rotor of a motor with an external power source in a non-contact manner, and is characterized by comprising: a core part disposed inside a hollow motor shaft in a coaxial structure with the motor shaft; a primary coil part installed on the outer circumferential surface of the core part; a secondary coil part which is installed on an inner main surface of the motor shaft and surrounds the primary coil part at a predetermined interval (air gap) therefrom; and a rectifier circuit part which is coupled to the motor shaft and rotates in synchronization therewith, and which is electrically connected to the secondary coil part.

11 Claims, 35 Drawing Sheets

(51) Int. Cl.
*H02K 7/00* (2006.01)
*H02K 7/08* (2006.01)

(56) References Cited

U.S. PATENT DOCUMENTS

| | | | |
|---|---|---|---|
| 2012/0038308 | A1 | 2/2012 | Zadeh |
| 2021/0408875 | A1 | 12/2021 | Maier et al. |

FOREIGN PATENT DOCUMENTS

| | | | |
|---|---|---|---|
| FR | 2624669 | | 6/1989 |
| JP | 06-036940 | | 7/1986 |
| JP | S61174606 | | 8/1986 |
| JP | 03-259919 | | 2/1994 |
| JP | H0870541 | | 3/1996 |
| JP | 2011507611 | | 3/2011 |
| JP | 2013021749 | | 1/2013 |
| JP | 2015087308 | | 5/2015 |
| JP | 2018110498 | | 7/2018 |
| KR | 101448608 | | 10/2014 |
| KR | 1020150145474 | | 12/2015 |
| KR | 10-2018-0015450 | | 2/2018 |
| WO | 2013/084164 | A2 | 6/2013 |

OTHER PUBLICATIONS

PCT International Search Report and Written Opinion for International Application No. PCT/KR2022/014001, dated May 2, 2023.
Office Action for Chinese Patent Application No. 202280087809.5, mailed Feb. 22, 2025.
European search report for Patent Application No. 22924311.8, mailed Jan. 4, 2025.

* cited by examiner

FIG.8

| air gap | 1mm | 2mm | 3mm | 4mm |
|---|---|---|---|---|
| coupling coefficient | 98.76 % | 97.55 % | 96.20 % | 94.75 % |
| primary coil DC resistance | 33.68 mΩ | 33.68 mΩ | 33.68 mΩ | 33.73 mΩ |
| primary coil AC resistance | 1777.91 mΩ | 1565.72 mΩ | 1358.71 mΩ | 1167.51 mΩ |
| secondary coil DC resistance | 8.46 mΩ | 8.46 mΩ | 8.46 mΩ | 8.47 mΩ |
| secondary coil AC resistance | 449.84 mΩ | 398.37 mΩ | 345.21 mΩ | 290.11 mΩ |
| ferrite loss | 55.32 mW | 67.87 mW | 89.83 mW | 92.53 mW |
| copper loss | 33.77 mW | 33.77 mW | 33.77 mW | 33.81 mW |

FIG. 11

| air gap | 1mm | 2mm | 3mm | 4mm |
|---|---|---|---|---|
| coupling coefficient | 9.31 % | 7.73 % | 7.18 % | 6.58 % |
| primary coil DC resistance | 0.28 mΩ | 0.48 mΩ | 0.48 mΩ | 0.48 mΩ |
| primary coil AC resistance | 1.14 mΩ | 1.17 mΩ | 1.1 mΩ | 1.08 mΩ |
| secondary coil DC resistance | 8.46 mΩ | 8.46 mΩ | 8.46 mΩ | 8.47 mΩ |
| secondary coil AC resistance | 52.55 mΩ | 51.28 mΩ | 48.92 mΩ | 48.67 mΩ |
| ferrite loss | 10.02 mW | 15.89 mW | 18.29 mW | 19.23 mW |
| copper loss | 5.28 mW | 6.23 mW | 6.33 mW | 6.15 mW |

FIG. 14

| air gap | 1mm | 2mm | 3mm | 4mm |
|---|---|---|---|---|
| coupling coefficient | 98.84 % | 98.21 % | 97.55 % | 96.88 % |
| primary coil DC resistance | 11.01 mΩ | 11.01 mΩ | 11.01 mΩ | 11.01 mΩ |
| primary coil AC resistance | 1448.51 mΩ | 1410.22 mΩ | 1291.61 mΩ | 1210.33 mΩ |
| secondary coil DC resistance | 2.69 mΩ | 3.20 mΩ | 3.92 mΩ | 4.98 mΩ |
| secondary coil AC resistance | 365.59 mΩ | 360.64 mΩ | 337.47 mΩ | 322.84 mΩ |
| ferrite loss | 65.37 mW | 67.11 mW | 69.43 mW | 69.56 mW |
| copper loss | 22.16 mW | 27.04 mW | 27.58 mW | 29.22 mW |

FIG. 17

| air gap | 1mm | 2mm | 3mm | 4mm |
|---|---|---|---|---|
| coupling coefficient | 97.72 % | 96.89 % | 96.41 % | 95.91 % |
| primary coil DC resistance | 11.01 mΩ | 11.01 mΩ | 11.01 mΩ | 11.01 mΩ |
| primary coil AC resistance | 2376.81 mΩ | 2602.22 mΩ | 2599.23 mΩ | 2614.73 mΩ |
| secondary coil DC resistance | 2.69 mΩ | 3.20 mΩ | 3.91 mΩ | 4.98 mΩ |
| secondary coil AC resistance | 594.37 mΩ | 645.31 mΩ | 641.13 mΩ | 642.24 mΩ |
| ferrite loss | 62.77 mW | 65.93 mW | 66.77 mW | 68.42 mW |
| copper loss | 22.88 mW | 27.42 mW | 28.02 mW | 29.89 mW |

NON-CONTACT ROTARY TRANSFORMER AND MOTOR COMPRISING SAME

TECHNICAL FIELD

The present invention relates to an electric supply device for supplying electricity to a rotor of a motor, and more specifically, to a non-contact rotary transformer, which connects the rotor of the motor to an external power source in a non-contact manner, and a motor comprising the same.

BACKGROUND ART

A wound rotor synchronous motor is primarily used in an electric vehicle since having superior torque and power density when compared to other motors. In general, the wound rotor synchronous motor employs a method of electrically connecting the rotor inside the motor to an external power source using a slip ring and a brush, which are in mechanical contact with each other, to supply electricity.

However, the conventional contact type electric supply method using the slip ring and the brush has a problem that the brush is deformed or damaged due to continuous friction between the slip ring rotating along with the motor shaft and the brush fixed to the motor housing during driving of the motor. Accordingly, there is a risk of a fire due to sparks occurring between the slip ring and the brush. Additionally, wear on the brushes may produce a significant amount of dust.

To overcome the above problems of the conventional art, a technology to electrically connect a rotor to an external power source in a non-contact manner has been proposed. The technology utilizes the phenomenon where, when current flows through one of two facing coils, voltage is induced into the other coil such that current flows (electromagnetic induction), so an electrical connection between the external power source and the rotor can be realized without any direct contact between the components.

FIG. 1 is a sectionally perspective view of a conventional non-contact wound rotor synchronous motor to which technology for connecting a rotor of a motor to an external power source is applied in a non-contact manner, and FIG. 2 is an exploded perspective view of a transformer that is essential for electrically connecting the rotor of the motor to the external power source in the non-contact manner in FIG. 1.

Referring to FIGS. 1 and 2, the conventional wound rotor synchronous motor includes a motor housing 100, and a motor shaft 200, which is rotatably supported within the motor housing 100 by bearings. A stator 120 is coupled inside the motor housing 100, and a rotor 220, which generates electromagnetic force by interacting electromagnetically with the stator 120 to rotate the motor shaft 200, is installed on the motor shaft 200.

The rotor 220 is electrically connected to an external power source through a transformer 300 which includes two opposing coils, without direct contact. A rectifier 400 is installed between the transformer 300 and the rotor 220 so that the current from the external power source is transformed to an appropriate level through the transformer 300, is converted from AC to DC by the rectifier, and then, is supplied to the rotor 220.

The transformer 300 includes a primary coil 310 on the stator side installed in the motor housing 100 and a secondary coil 320 on the rotor side, which is coupled to the motor shaft 200 and rotates in synchronization with the rotor 220.

The primary coil 310 and the secondary coil 320 are arranged to face each other with a predetermined distance (air gap), and a primary ferrite core 312 and a secondary ferrite core 322, which are respectively fixed to the motor housing 100 and the motor shaft 200, respectively accommodate the primary coil 310 and the secondary coil 320.

In FIG. 2, a reference numeral 314 indicates a primary ferrite case covering the primary ferrite core 312, and a reference numeral 324 indicates a secondary ferrite case covering the secondary ferrite core 322.

However, the transformer which has the structure that the primary and secondary coils face each other has a problem in that since the secondary coil and the secondary ferrite core, which rotate with the motor shaft during the operation of the motor are simply spaced apart from the primary coil and the primary ferrite core, which do not rotate, with the predetermined air gap of less than 1 mm, the rotating secondary coil collides with the stationary primary coil during the rotation, leading to damage or scratches on the cores.

Particularly, ferrite materials used in the primary and secondary ferrite cores for concentration of magnetic flux and magnetic shielding are prone to breaking. Accordingly, in electric vehicles, which are exposed to harsher vibration environments compared to other industrial motors, the ferrite cores are highly concerned about damages due to road shocks during vehicle driving, thus lowering durability and reliability of the motor.

Additionally, because the secondary coil and the secondary ferrite core are located on the exterior of the motor shaft and rotate together with the rotor, they are subject to strong mechanical stresses due to centrifugal forces, so have a further higher risk of damage.

In addition, in the structure where two coils face each other, since the amount of power supplied to the rotor is proportional to the area where the coils face each other, higher power motors require radially expanded coils. In this case, the size of the motor must be increased as much as the volume of the coil is increased. However, the above counters the recent trend towards motor miniaturization, presenting a problem in meeting the demands for smaller motor designs.

PRIOR PATENT LITERATURE

Patent Document

Korean Patent Publication No. 10-2018-0015450 (Published on Feb. 13, 2018)

DISCLOSURE

Technical Problem

Accordingly, the present invention has been made in view of the above-mentioned problems occurring in the related art, and it is an objective of the present invention to provide a non-contact rotary transformer, which can realize an electrical connection between an external power source and a rotor with a wider air gap than that of the conventional technology having the structure that coils face each other, and a motor comprising the same.

It is another objective of the present invention to provide a non-contact rotary transformer, which instead of fragile ferrite, uses materials with higher durability such as stainless steel for cores of the transformer, thereby enhancing durability, and a motor comprising the same.

It is a further objective of the present invention to provide a non-contact rotary transformer, which is advantageous for miniaturization of the motor compared to the conventional rotary transformer mounted outside the motor shaft, and a motor comprising the same.

Technical Solution

To accomplish the above-mentioned objects, according to the present invention, there is provided a non-contact rotary transformer, which is a device for connecting a rotor of a motor to an external power source in a non-contact manner,

- including: a core part arranged inside a hollow motor shaft in a coaxial structure with a motor shaft;
- a primary coil part installed on the outer circumferential surface of the core part;
- a secondary coil part installed on an inner circumferential surface of the motor shaft and surrounding the primary coil part at a predetermined interval (air gap) therefrom;
- and a rectifier circuit part coupled to the motor shaft, rotating in synchronization with the motor shaft, and electrically connected to the secondary coil part.

In the non-contact rotary transformer, the core part is installed inside the motor shaft through one or more internal bearings, such that the core part and the primary coil part are free from the rotation of the motor shaft, and the secondary coil part installed on the inner circumferential surface of the motor shaft performs a rotational motion in synchronization with the motor shaft.

Here, the internal bearings include: a front bearing installed between the motor shaft and the core part in front of the primary and secondary coil parts; and a rear bearing installed between the motor shaft and the core part behind the primary and secondary coil parts.

Moreover, a hole or a groove for inducing a cable of the primary coil part from the outside to the inside of the motor shaft is formed on the central part or the outer surface of the core.

Furthermore, a shielding member for magnetic shielding is installed between the secondary coil part and the motor shaft.

Additionally, the core part is made of magnetic material and is formed in a round bar shape, and the core part is made of stainless steel.

As a preferred embodiment, the rectifier circuit part applied to the non-contact rotary transformer according to an aspect of the present invention is installed outside the motor shaft.

In this case, the rectifier circuit part is accommodated in a metal receptor coupled to the outer circumferential surface of one end of the motor shaft, and the metal receptor is made of aluminum.

As another preferred embodiment, the rectifier circuit part may be embedded inside (hollow part) of the motor shaft together with the core part and the coil parts.

As occasion demands, two or more primary coil parts are provided, and secondary coil parts are configured to correspond to each of the two or more primary coil parts.

According to another aspect of the present invention, there is provided a motor including:

- a motor housing;
- a hollow motor shaft rotatably supported at the center of the motor housing;
- a stator coupled inside the motor housing;
- a rotor coupled to the motor shaft, and generating rotational force for rotating the motor shaft by interaction with the stator; and
- a non-contact rotary transformer installed in the hollow motor shaft according to one of the previously described aspects.

Advantageous Effects

According to embodiments of the present invention, the non-contact rotary transformer and the motor comprising the same can realize the electrical connection between the external power source and the rotor with a wider air gap (distance between two coils) than that of the conventional technology having the coils facing each other, and can significantly improve durability of the motor since the structural design significantly reduces the possibility of physical contact and damages between the coils.

Moreover, when the same metal material as the motor housing and the motor shaft, such as stainless steel, instead of structurally fragile ferrite is used for the core, it does not significantly affect the change (decrease volume) in the coupling coefficient, which is characteristics indicating transformer efficiency. In other words, the non-contact rotary transformer and the motor comprising the same use stainless steel instead of ferrite, which is less durable, for the cores, thereby enhancing durability and reliability of the motor.

Furthermore, the non-contact rotary transformer and the motor comprising the same can reduce costs and realize the motor at a more economical cost since stainless steel is relatively cheaper than ferrite, thereby increasing price competitiveness.

In addition, as most or all components of the rotary transformer are installed inside the hollow motor shaft, the size of the motor can be significantly reduced compared to that of the conventional wound rotor synchronous motor which has the rotary transformer mounted on the exterior of the motor shaft, thereby responding to the market demands for miniaturization, facilitating control by reducing the rotational inertia of the rotor, and eliminating the complexity of needing additional balancing members to address mass imbalance in the rotation direction of the rotor.

DESCRIPTION OF DRAWINGS

FIG. 8 is a table showing the simulation results of FIGS. 6 and 7.

FIG. 11 is a table showing the simulation results of FIGS. 9 and 10.

FIG. 14 is a table showing the simulation results of FIGS. 12 and 13.

FIG. 17 is a table showing the simulation results of FIGS. 15 and 16.

MODE FOR INVENTION

Figure 1:
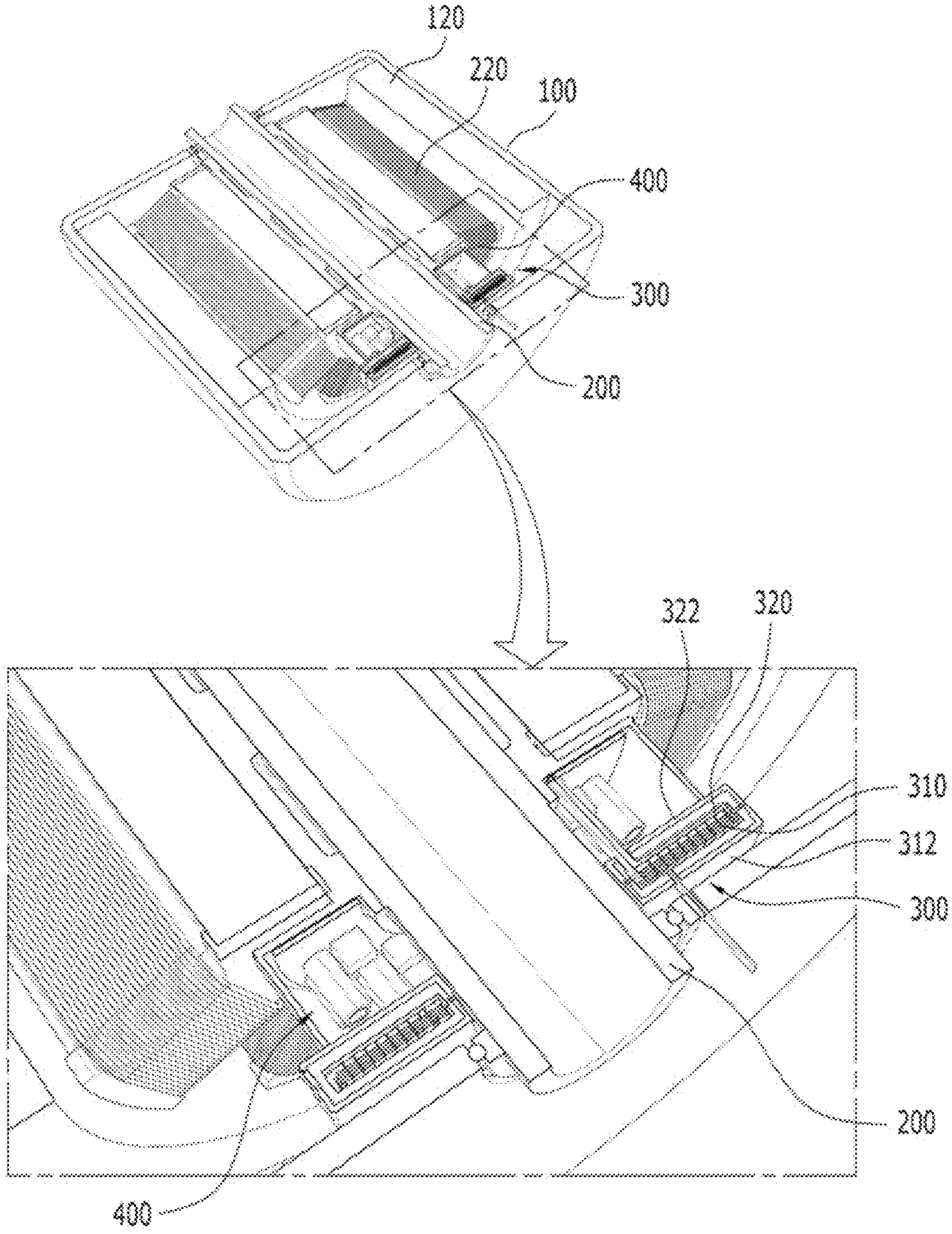
FIG. 1 is a sectionally perspective view of a conventional non-contact wound rotor synchronous motor to which technology for connecting a rotor of a motor to an external power source is applied in a non-contact manner.

Hereinafter, preferred embodiments of the present invention will be described in detail with reference to the accompanying drawings.

In description of the present invention, terms used in the following description are intended to merely describe specific embodiments, but not intended to limit the invention. An expression of the singular number includes an expression of the plural number, so long as it is clearly read differently.

The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Furthermore, terms, such as "first" or "second" may be used in the specification to describe various components but are not restricted to the above terms. The terms may be used to discriminate one component from another component.

In the following description, terms such as "unit" and "module" indicate a unit for processing at least one function or operation, wherein the unit and the block may be embodied as hardware or software or embodied by combining hardware and software.

In description of the present invention with reference to the accompanying drawings, like elements are referenced by like reference numerals or signs regardless of the drawing numbers and description thereof is not repeated. In the description, details of well-known features and techniques may be omitted to avoid unnecessarily obscuring the presented embodiments.

Figure 3:
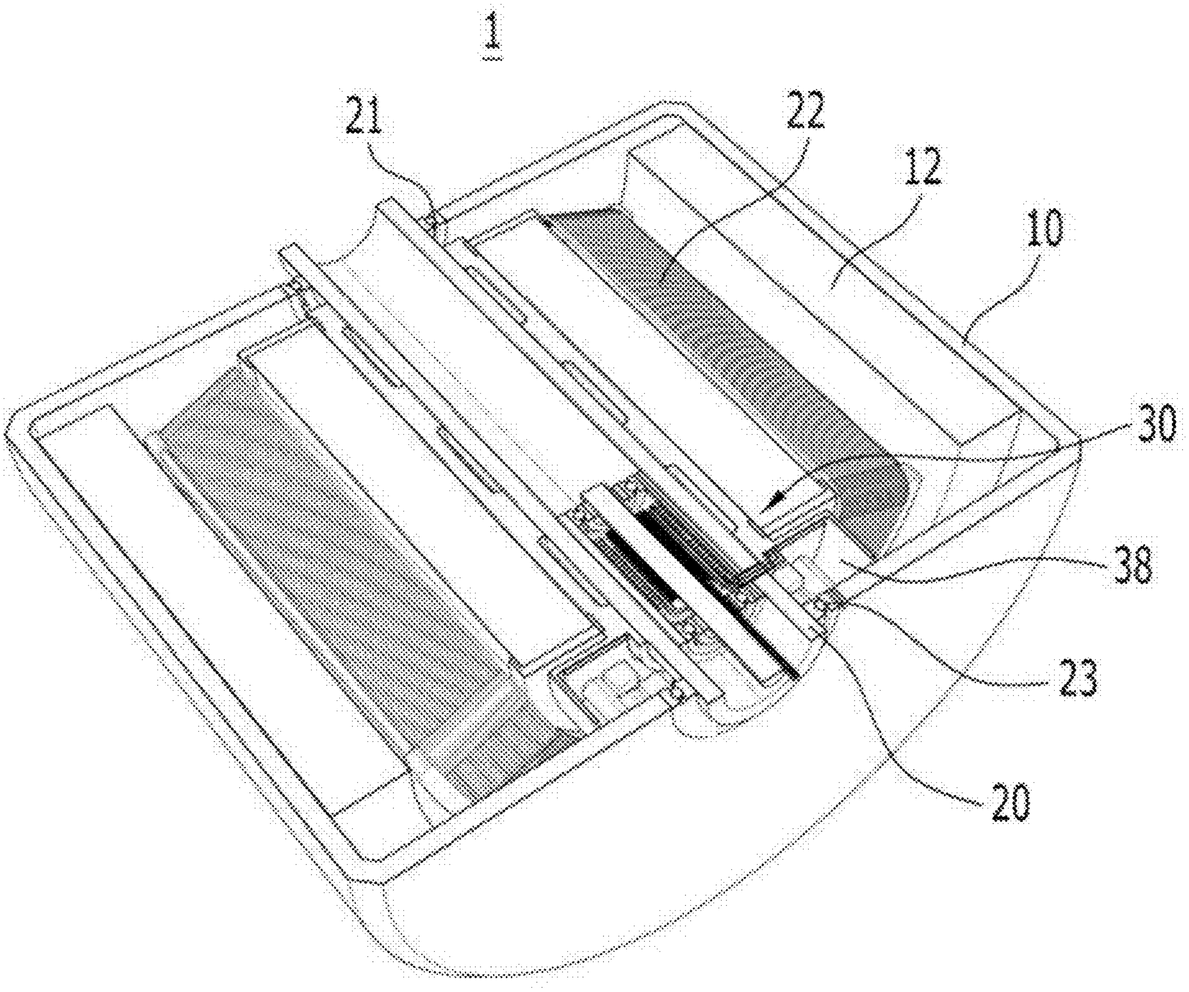
FIG. 3 is a sectionally perspective view of a wound rotor synchronous motor to which a non-contact rotary transformer according to an embodiment of the present invention is applied.

FIG. 3 is a sectionally perspective view of a wound rotor synchronous motor to which non-contact rotary transformer according to an embodiment of the present invention is applied. Referring to FIG. 3, the overall configuration of the wound rotor synchronous motor to which a non-contact rotary transformer according to an embodiment of the present invention is applied will be described in brief.

Referring to FIG. 3, the non-contact wound rotor synchronous motor 1 according to the present invention includes a motor housing 10 and a motor shaft 20 installed along the center of the motor housing 10. The motor shaft 20 is configured in the center of the motor housing 10 through bearings, more specifically, a front bearing 21 and a rear bearing 23 to be freely rotatable, and a rotor 22 is coupled to the outer circumferential surface of the motor shaft.

The rotor 22 may be a field system made of electromagnets operated by direct current. Moreover, inside the motor housing 10, a stator 12 is installed corresponding to the rotor 22. The stator 12 may be an armature made of electromagnets operated by alternating current supplied from an inverter of an electric vehicle or an external power source.

Under the control of a controller, when alternating current and direct current are respectively applied to the stator 12 and the rotor 22, due to an electromagnetic interaction between the stator 12 and the rotor 22, a force (electromagnetic force) that causes the rotor 22 to rotate the motor shaft 20 is generated. The force allows the motor shaft 20 to rotate, thereby outputting rotational power. The principle of force generation due to the interaction between the stator 12 and the rotor 22 is a known concept, and hence detailed description will be omitted.

The rotor 22 can be electrically connected to an external power source through a rotary transformer 30 without direct contact according to an embodiment of the present invention. The rotary transformer 30 includes a rectifier circuit part 38, and thus, the power supplied from outside can be transformed to an appropriate level and converted from AC to DC through the rotary transformer 30 according to an embodiment of the present invention, and then, supplied to the field power of the rotor 22.

The rotary transformer 30 according to an embodiment of the present invention may be entirely or partially embedded within the motor shaft 20. For instance, as illustrated in FIG. 3, all components except the rectifier circuit part 38 may be embedded within the hollow motor shaft 20, or as will be described in another embodiment illustrated in FIG. 18, all components including the rectifier circuit part 38 may be installed within the hollow motor shaft 20.

Figure 4:
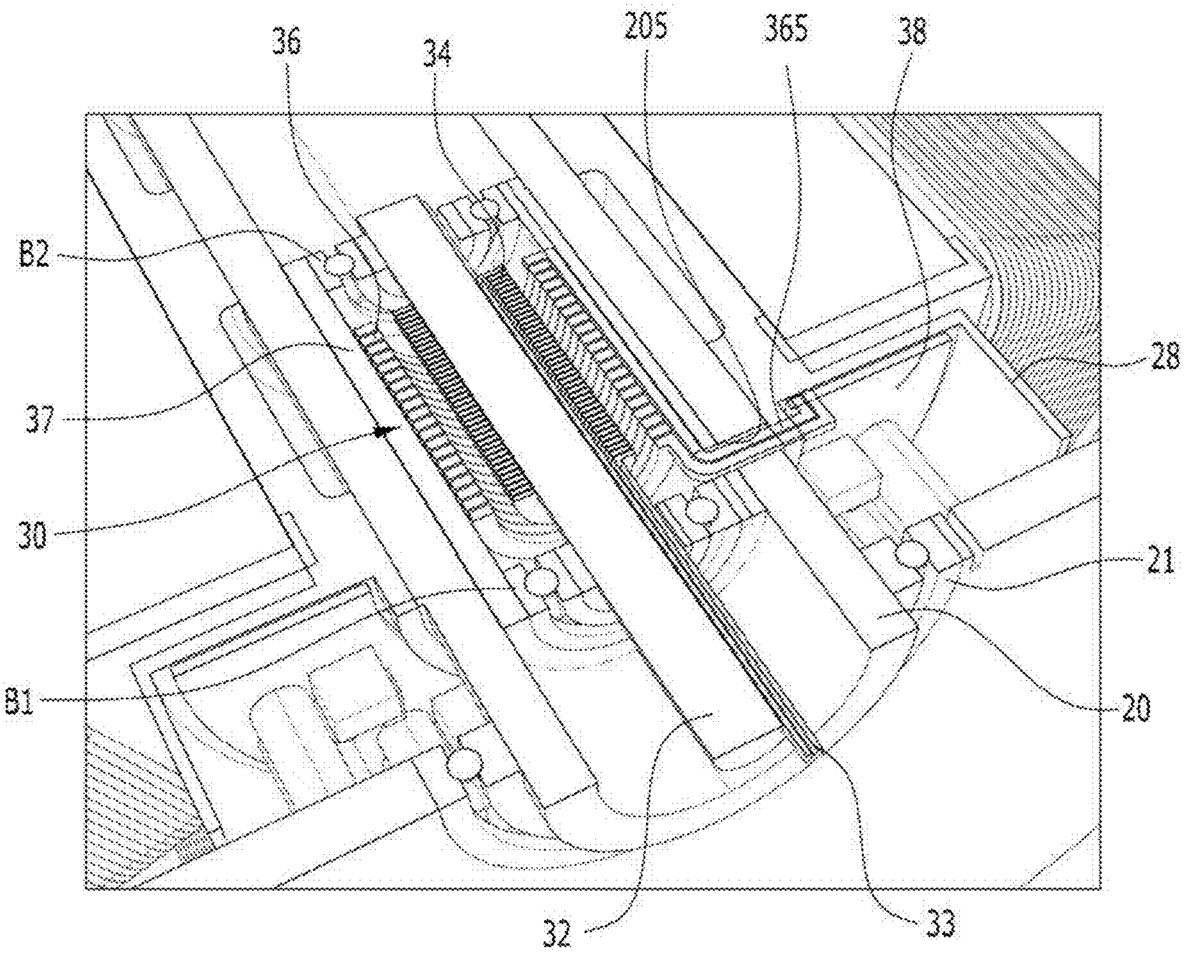
FIG. 4 is an enlarged view of the rotary transformer in FIG. 3.
Figure 5:
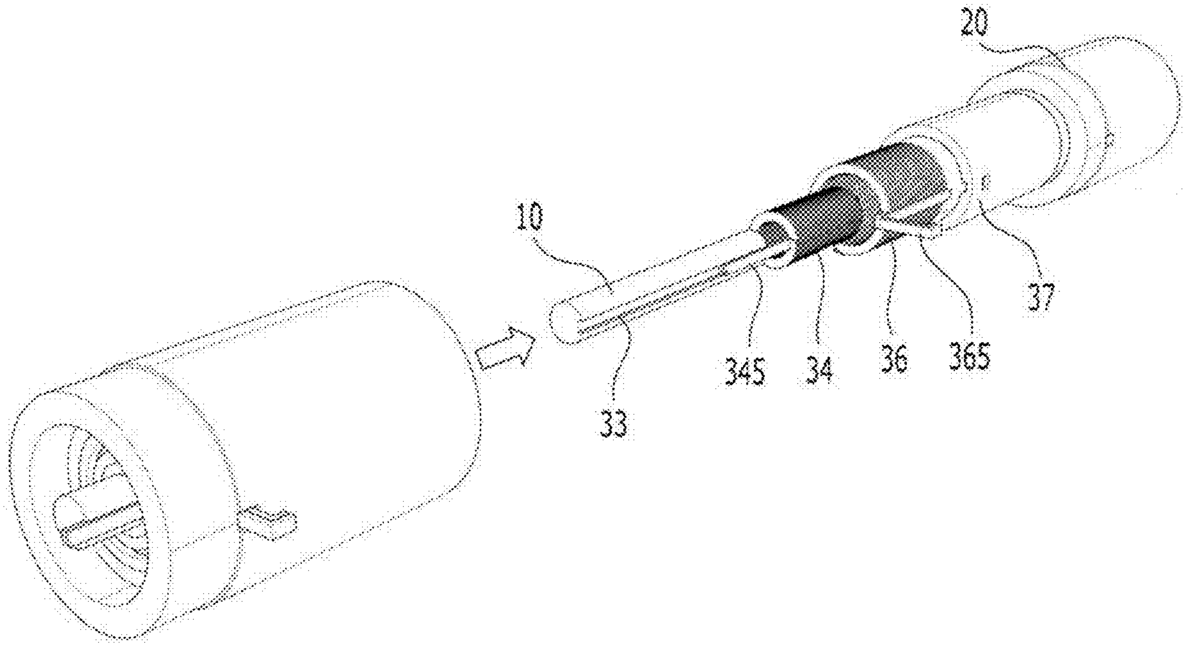
FIG. 5 is an exploded view illustrating essential components of the rotary transformer illustrated in FIG. 4.

FIG. 4 is an enlarged view of the rotary transformer in FIG. 3, showing the configuration of the rotary transformer in which all components except the rectifier circuit part 38 are embedded within the motor shaft. FIG. 5 is an exploded view illustrating essential components of the rotary transformer illustrated in FIG. 4.

Figure 2:
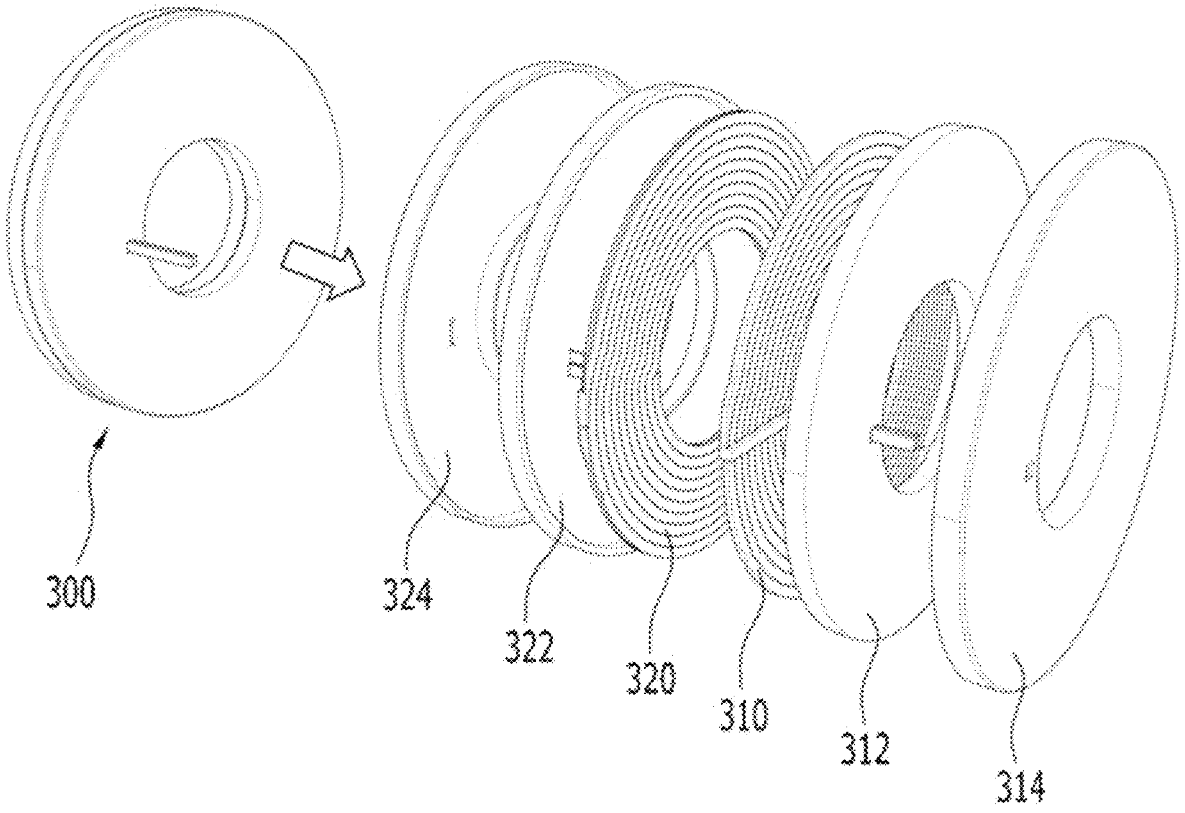
FIG. 2 is an exploded perspective view of a transformer that is essential for electrically connecting the rotor of the motor to the external power source in the non-contact manner in FIG. 1.

Referring to FIGS. 4 and 5, the rotary transformer 30 according to an embodiment of the present invention includes a core part 32. The core part 32 may be arranged concentrically inside the hollow motor shaft 20, that is, may be installed in a concentric structure within the motor shaft 20 through one or more internal bearings, preferably, two bearings (a front bearing B1 and a rear bearing B2) spaced apart from each other at a distance within the motor shaft 20 illustrated in FIG. 2.

The core part 32 is made of a magnetic material and can have a round rod form of which a cross-section is in a circular shape. The core part 32 can be a round rod made of the same material as the motor housing 10 and the motor shaft 20, such as stainless steel. The core part 32 made from stainless steel can show motor characteristics similar to the core made of ferrite, which is less durable, and enhance durability, thereby improving motor reliability and reducing costs.

A primary coil part 34 is configured on On the outer circumferential surface of the core part 32. The primary coil part 34 can be formed by continuously winding a conductive cable along the outer surface of the core part 32, and a power input terminal 345 of the conductive cable of the primary coil part 34 can be connected to an inverter of an electric vehicle or an external power source. Here, the conductive cable may be, for example, a Litz wire, a flat ribbon wire, or an insulated wire.

The power input terminal 345 of the conductive cable of the primary coil part 34 may be introduced from the outside to the inside of the motor shaft 20 through an opening at one end of the motor shaft 20 along a groove 33 formed longitudinally on the outer surface of the core part 32, or may pass through a hole formed longitudinally in the center of the core part 32 or a hole formed in the inner race of the front bearing B1 and extend from the outside of the motor shaft 20 to the position where the primary coil part 34 is formed (not illustrated).

A secondary coil part 36 is installed on the inner circumferential surface of the motor shaft 20. The secondary coil part 36 may be the same conductive cable as the cable of the primary coil part 34. More specifically, the secondary coil part 36 can be formed by continuously winding the conductive cable in a coil form, and can be installed on the inner circumferential surface of the motor shaft 20 to surround the primary coil part 34 to be spaced apart from the primary coil part 34 at a predetermined distance (air gap).

As described above, the core part 32 can be installed in a concentric structure within the motor shaft 20 through one or more internal bearings B1 and B2. Therefore, the core part 32 and the primary coil part 34 installed thereon are free from the rotation of the motor shaft 20, and the secondary coil part 36 surrounding the primary coil part 34 inside the motor shaft 20 is installed on the inner circumferential surface of the motor shaft 20 to perform rotational motion synchronized with the motor shaft 20.

That is, when power is applied, a force (electromagnetic force) to rotate the motor shaft 20 is generated to the rotor 22 by the interaction between the rotor 22 and the stator 12. Accordingly, even if the motor shaft 20 rotates, the core part 32 and the primary coil part 34 which are concentrically arranged inside the motor shaft 20 do not rotate, and only the secondary coil part 36 installed on the inner circumferential surface of the motor shaft 20 rotates together with the motor shaft 20.

The internal bearings that support the core part 32 within the motor shaft 20 to be rotatable can preferably include a front bearing B1 and a rear bearing B2, as illustrated in FIG. 4. The front bearing B1 can be installed between the motor shaft 20 and the core part 32 in front of the primary coil part 34 and the secondary coil part 36, and the rear bearing B2 can be installed between the motor shaft 20 and the core part 32 behind the primary coil part 34 and the secondary coil part 36.

A shielding member 37, made of a magnetic material, may be installed between the secondary coil part 36 and the motor shaft 20. The shielding member 37 is intended to isolate the primary coil part 34 and the secondary coil part 36 from the external magnetic field, and can be formed in a cylindrical shape longer than the secondary coil part 36 to accommodate the entirety of the secondary coil part 36 surrounding the primary coil part 34. Preferably, the shielding member 37 can be an aluminum cylinder longer than the secondary coil part 36.

The conductive cable forming the secondary coil part 36 can be electrically connected to the rectifier circuit part 38. In an embodiment of the present invention, the rectifier circuit part 38 can be installed outside the motor shaft 20. In this case, the rectifier circuit part 38 can be coupled to the motor shaft 20 in a space formed between the shear surface of the rotor 22 and the front end plate (not labeled) of the motor housing 10 to perform rotational motion synchronized with the motor shaft 20.

The rectifier circuit part 38 may include a substrate and rectifying elements mounted thereon, such as diodes, and can be accommodated in a metal receptor 28 coupled to the outer surface of one end of the motor shaft 20. The substrate may be connected to the conductive cable (cable of the secondary coil part 36) withdrawn outward from the inside of the motor shaft 20 through a cable withdrawing hole 205 formed in the motor shaft 20, and the metal receptor 28 can be made of aluminum.

The process that the external power supply is provided to the field power source of the rotor 22 through the rotary transformer 30 according to an embodiment of the present invention will be described in brief.

The alternating current supplied by an external power source, such as an inverter of an electric vehicle, is applied to the rotary transformer 30 through the power input terminal 345 of the conductive cable of the primary coil part 34. The applied alternating current causes a current to flow in the primary coil part 34, and the current flowing in the primary coil part 34 induces a secondary current (transformed current, or alternating current) in the secondary coil part 36, spaced at a predetermined distance by the principle of electromagnetic induction.

The secondary current generated in the secondary coil part 36 is provided to the rectifier circuit part 38 through the power output terminal 365 of the conductive cable of the secondary coil part 36. After being converted from AC to DC in the rectifier circuit part 38, the current is supplied to the rotor 22 electrically connected to the output side of the rectifier circuit part 38. As a result, the rotor 22 becomes magnetized, and synchronously rotates due to the induced magnetic field of the stator 12.

Here, the power output terminal 365 of the conductive cable of the secondary coil part 36 can be withdrawn from the inside to the outside of the motor shaft 20 through the cable withdrawing hole 205 radially formed in the motor shaft 20, and then, can be electrically connected to the rectifier circuit part 38 accommodated in the metal receptor 28 coupled to the outside of the motor shaft 20.

Figure 6A:
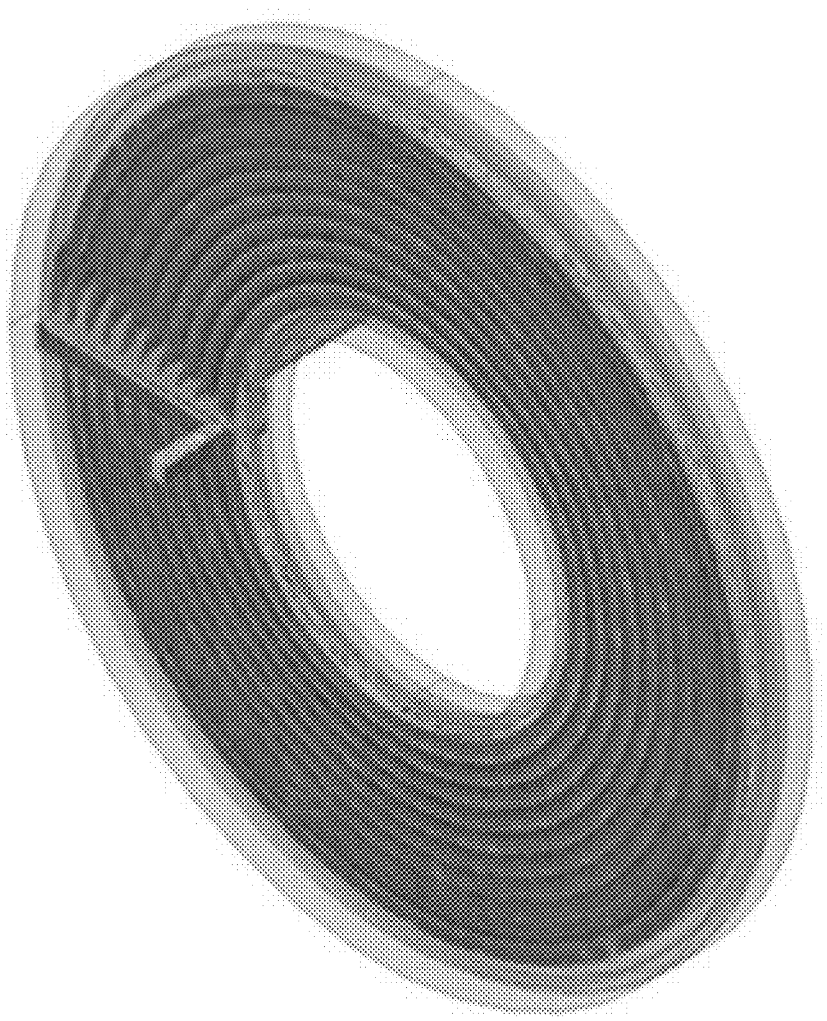
FIGS. 6 and 7 are graphic views showing simulation results of a conventional non-contact rotary transformer having a structure that two coils face each other.
Figure 6B:
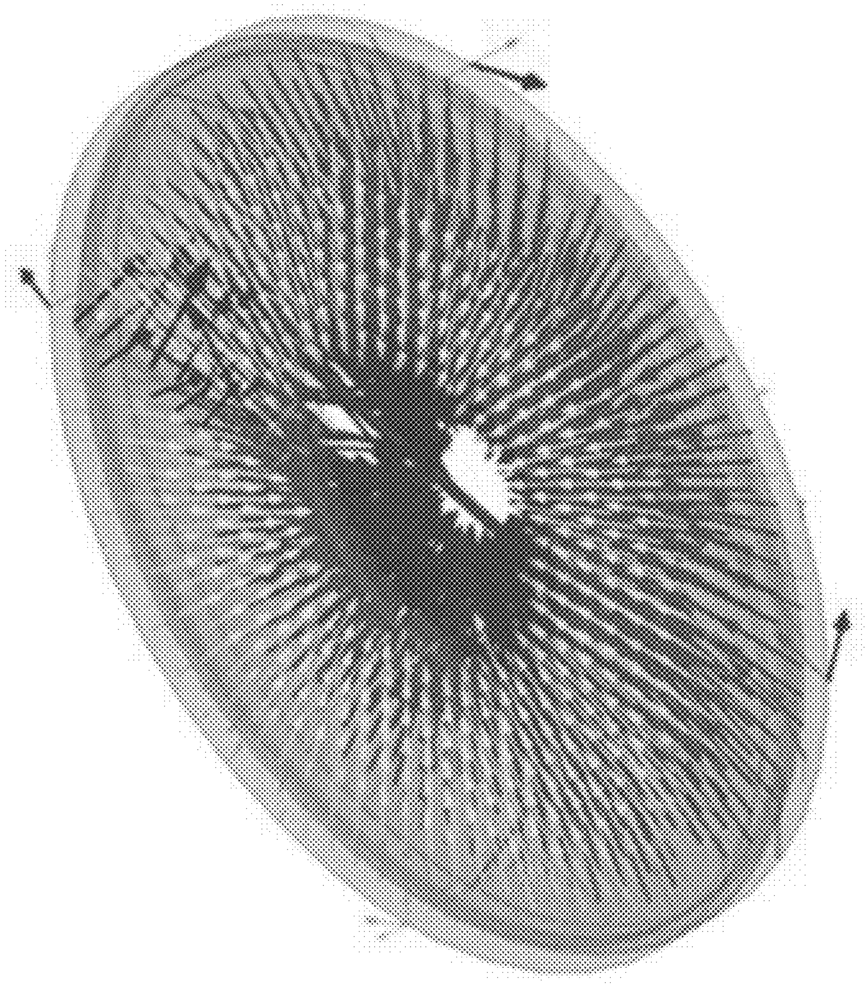
Figure 7A:
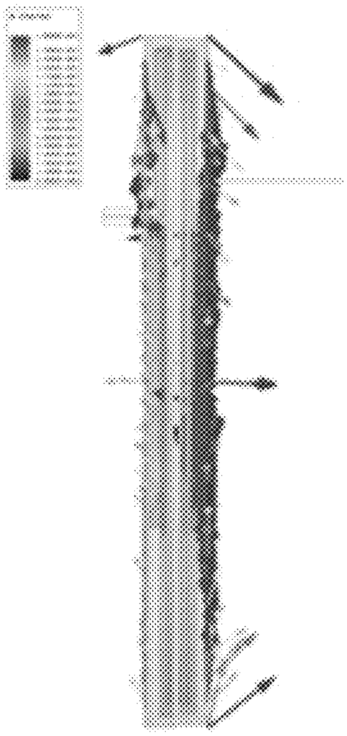
Figure 7B:
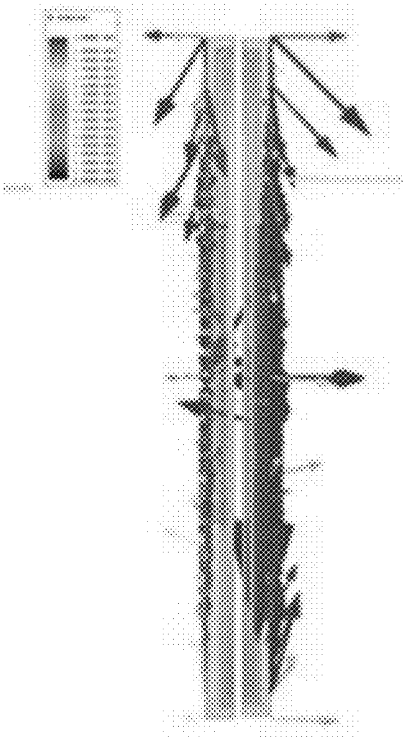
Figure 7C:
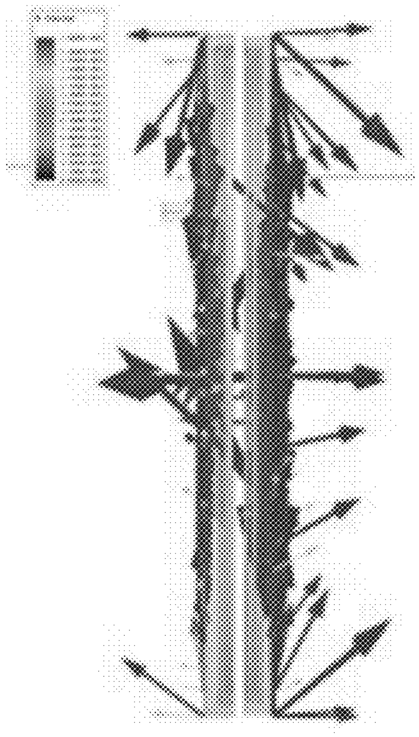
Figure 7D:
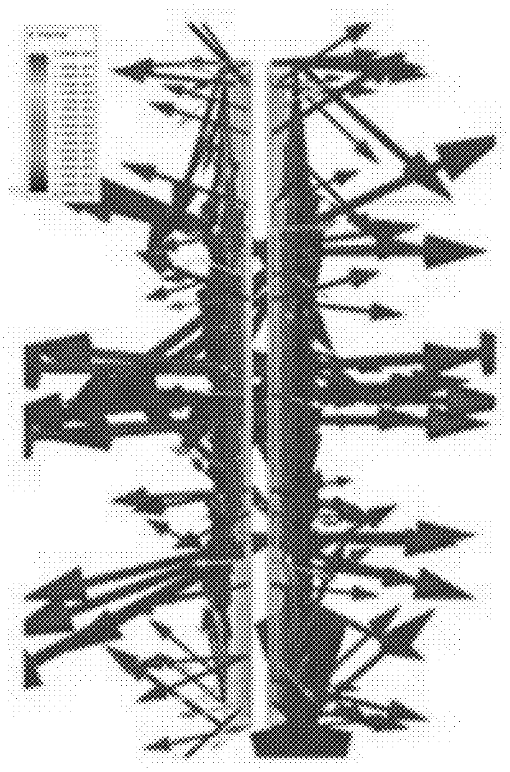

FIGS. 6 and 7 are graphic views showing simulation results of a conventional non-contact rotary transformer having a structure that two coils face each other. Here, as the simulation parameters, the coil was made of copper, and permeability of the ferrite core was set to 3300.

FIG. 6(*a*) shows the density of alternating currents in the primary and secondary coils when the distance between the primary coil and the secondary coil, namely, the air gap, in the conventional non-contact rotary transformer having the structure that two coils face each other was 1 mm. Considering that the frequency of the alternating current used in an inverter of an electric vehicle is 20 kHz, it was analyzed that the alternating current was 20 kHz, and the results are shown in the table of FIG. 8.

FIG. 6(*b*) shows the magnetic flux between the primary ferrite core excited in the primary coil and the secondary ferrite core excited in the secondary coil when the distance between the primary coil and the secondary coil, namely, the air gap, in the conventional non-contact rotary transformer was 1 mm. Here, considering that the frequency of the alternating current used in an inverter of an electric vehicle is 20 kHz, it was analyzed that the alternating current was 20 kHz, and the results are shown in the table of FIG. 8.

FIGS. 7(*a*) through (*d*) illustrate the distribution of magnetic flux for each case when the air gap (the distance between the opposing primary and secondary coils) in the conventional non-contact rotary transformer was 1 mm, 2 mm, 3 mm, and 4 mm, respectively. FIG. 8 is a table showing simulation values of the graphic results illustrated in FIGS. 6(*a*), 6(*b*), 7(*a*), 7(*b*), 7(*c*) and 7(*d*). That is, the drawings show the simulation results of each of the cases when the air gap moves from 1 mm to 4 mm.

Referring to FIG. 8, it can be seen that the coupling coefficients of the rotary transformer decrease as the air gap increases. The coupling coefficients are characteristics indicating the efficiency of the transformer, and is closely related to transformer efficiency. More specifically, the coupling coefficients are proportional to transformer efficiency. Therefore, as the coupling coefficients increase, the transformer efficiency also increases. The principle is well-known and thus a detailed description will be omitted.

From the correlation between the transformer efficiency and the flow of magnetic flux, the performance of the rotary transformer can be analyzed.

As illustrated in FIG. 7(*a*), the magnetic flux between the primary ferrite core excited in the primary coil and the secondary ferrite core excited in the secondary coil forms a robust and small closed loop. It is because the primary coil which is the primary side of the rotary transformer and secondary coil which is the secondary side facilitate efficient energy exchange through the ferrite core.

Consequently, through the simulation results, it can be determined that the conventional non-contact rotary transformer having the structure that two coils face each other decreases the transformer efficiency as the distance between the primary coil and the secondary coil, namely the air gap, increases.

Meanwhile, the conventional non-contact rotary transformer having the structure that two coils face each other mainly uses ferrite cores as the magnetic material for the primary and secondary coils for concentration of magnetic flux and magnetic shielding. Ferrite has already been verified for its properties and is commonly used because there are no alternatives. However, despite there is a risk of damage due to the air gap during high-speed rotation, it continues to be used.

Figure 9A:
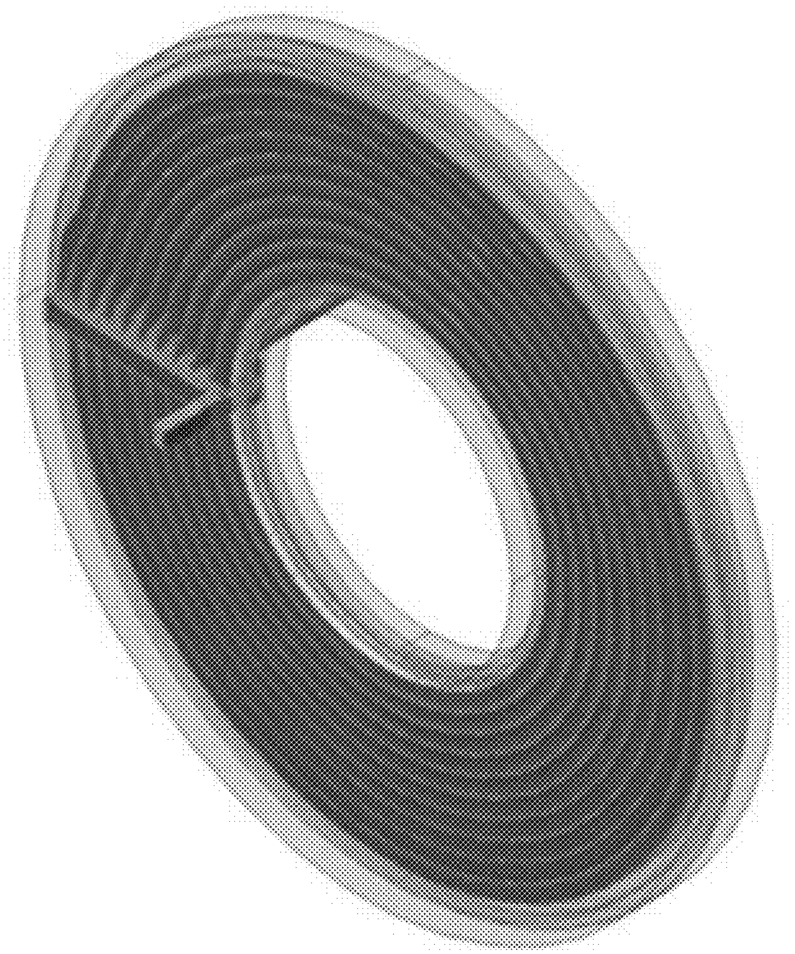
FIGS. 9 and 10 are graphic views showing simulation results when cores are made of stainless steel, instead of ferrite core, in the conventional non-contact rotary transformer having a structure that two coils face each other.
Figure 9B:
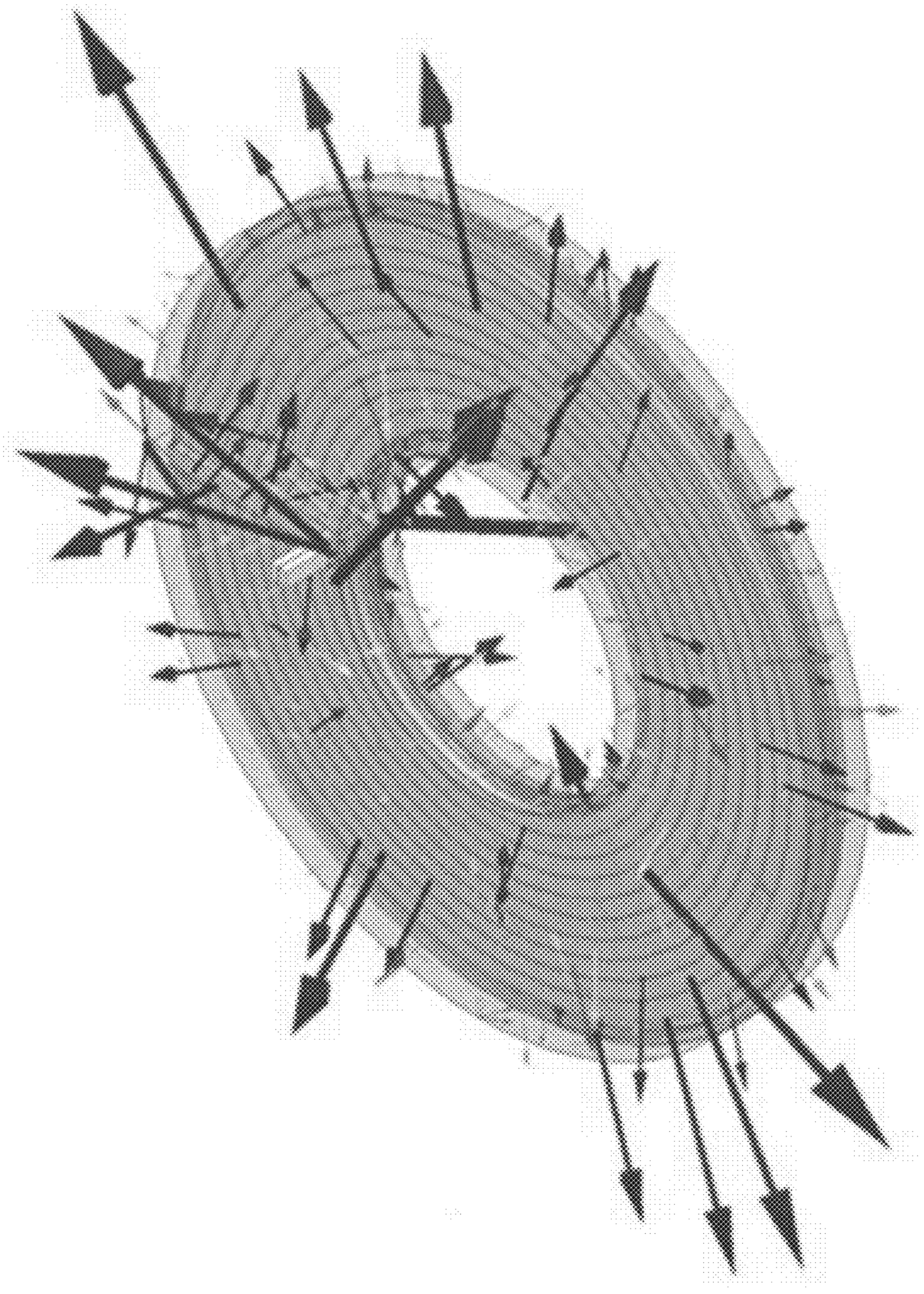
Figure 10A:
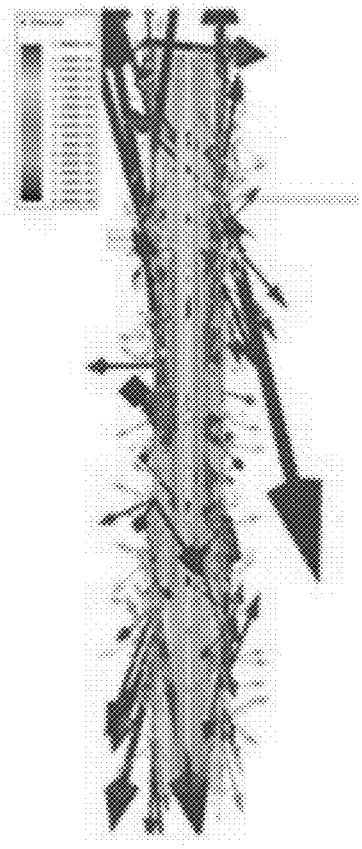
Figure 10B:
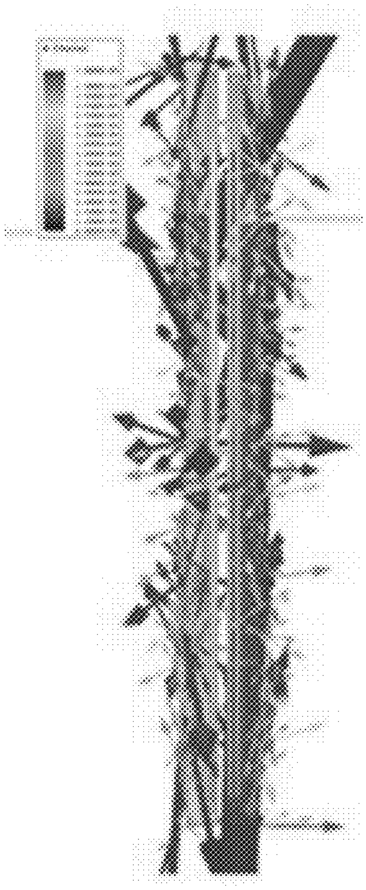
Figure 10C:
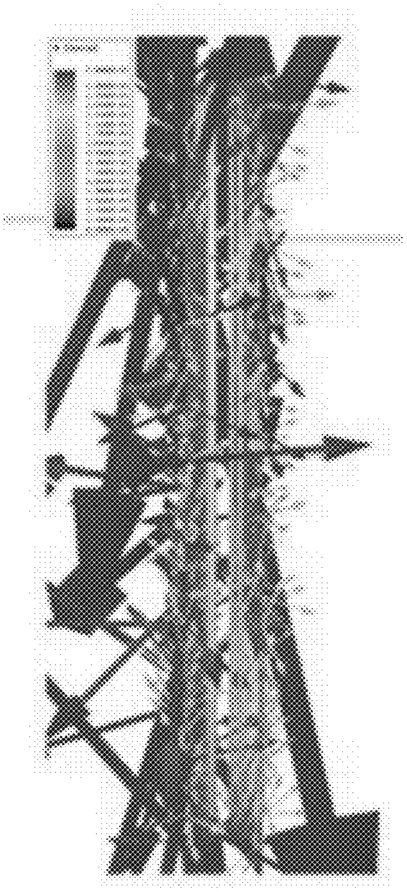
Figure 10D:
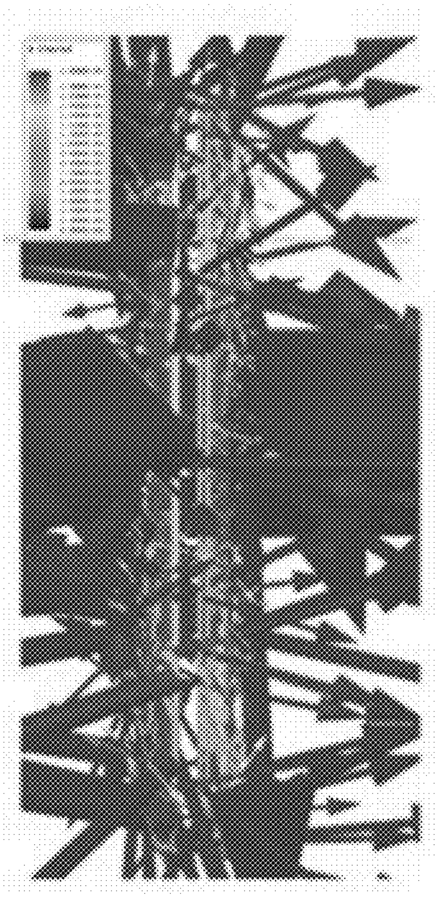

FIGS. 9 and 10 show the simulation results when replacing the ferrite core with a stainless steel core, which was the same material used for the motor housing and the hollow motor shaft, in the conventional non-contact rotary transformer having the structure that the two coils face each other. Here, as the simulation parameters, the coil was made of copper, and the ferrite core was made of stainless steel.

FIG. 9(*a*) shows the density of alternating currents in the primary and secondary coils when the distance between the primary coil and the secondary coil, namely, the air gap, in the case where the ferrite core was replaced with a stainless steel core in the conventional non-contact rotary transformer having the structure that two coils face each other is 1 mm. Considering that the frequency of the alternating current used in an inverter of an electric vehicle is 20 kHz, it was analyzed that the alternating current was 20 kHz, and the results are shown in the table of FIG. 8.

FIG. 9(*b*) shows the magnetic flux between the primary stainless steel core excited in the primary coil and the secondary stainless steel core excited in the secondary coil in the same structure as FIG. 9A. Here, considering that the frequency of the alternating current used in an inverter of an electric vehicle is 20 kHz, it was analyzed that the alternating current was 20 kHz, and the results are shown in the table of FIG. 11.

FIGS. 10(*a*) through (*d*) illustrate the distribution of magnetic flux for each case when only the air gap (the distance between the opposing primary and secondary coils) in the same configuration as FIG. 9 was changed to 1 mm, 2 mm, 3 mm, and 4 mm. FIG. 11 is a table showing simulation values of the graphic results illustrated in FIGS. 9(*a*), 9(*b*), 10(*a*), 10(*b*), 10(*c*) and 10(*d*). That is, the drawings show the simulation results of each of the cases when the air gap moves from 1 mm to 4 mm.

Referring to FIG. 11, through the values of the coupling coefficients, it can be observed that magnetic energy is not transferred at all air gaps (1 mm to 4 mm). In other words, in the conventional non-contact rotary transformer having the structure that two coils face each other, it means that it is impossible to replace the ferrite core, which houses the coils and is prone to damage, with a more durable stainless steel core.

Figure 12A:
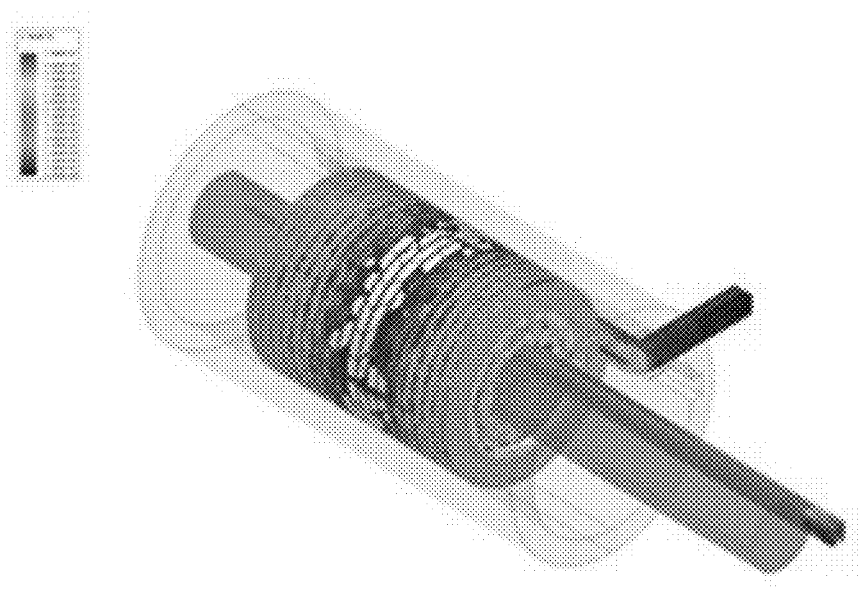
FIGS. 12 and 13 are graphic views showing simulation results of a rotary transformer having a structure that two coils are concentrically arranged inside a motor shaft according to an embodiment of the present invention.
Figure 12:
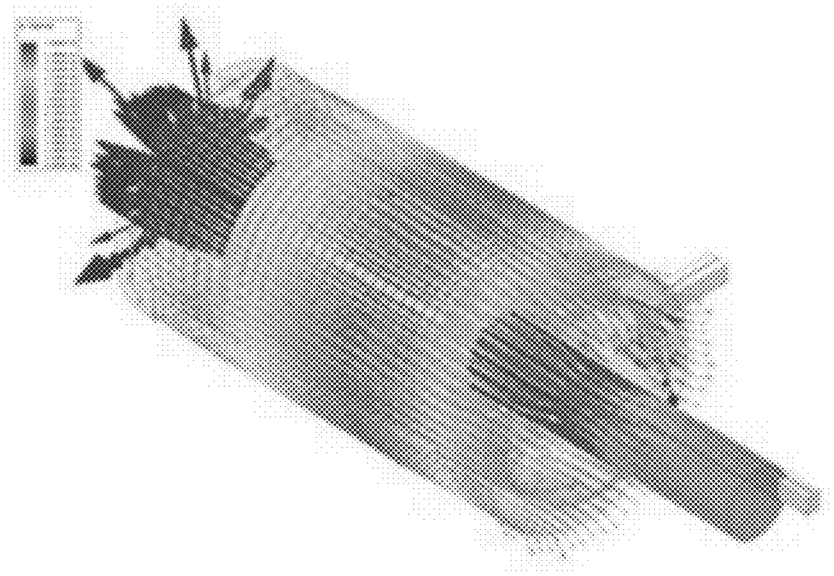
Figure 13A:
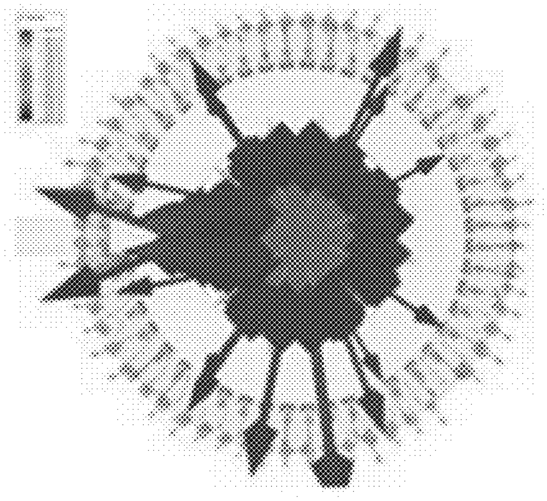
Figure 13B:
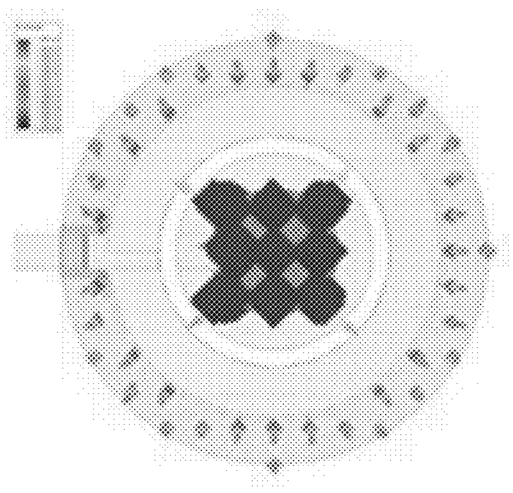
Figure 13C:
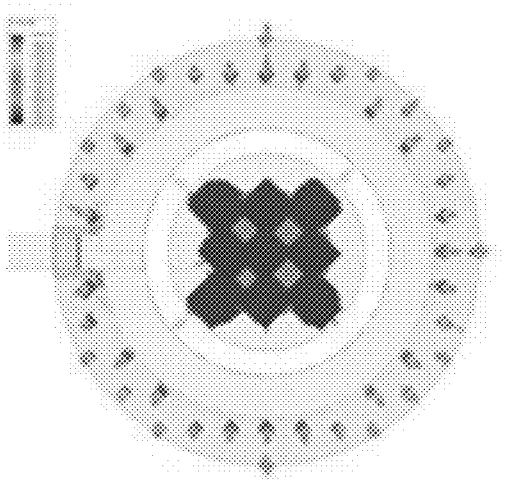
Figure 13D:
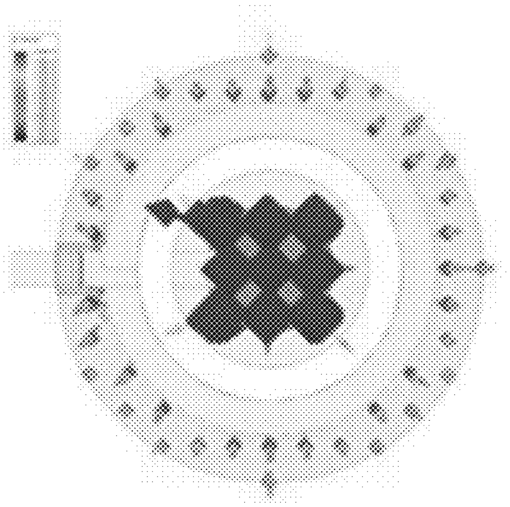

FIG. 12 and FIG. 13 are graphic views showing simulation results of a rotary transformer having a structure that two coils are concentrically arranged inside a motor shaft according to an embodiment of the present invention. Here, a ferrite core with a permeability of 3300 was used for the primary core part, and the coil was made of copper.

FIG. 12(*a*) shows the simulation results indicating the density of alternating currents in the primary coil part and the secondary coil part when the distance between the primary coil part and the secondary coil part of the rotary transformer according to an embodiment of the present invention was 1 mm. Considering that the frequency of the alternating current used in an inverter of an electric vehicle is 20 kHz, it was analyzed that the alternating current was 20 kHz, and the results are shown in the table of FIG. 8.

FIG. 12(*b*) shows the magnetic flux between the primary core part (ferrite core) excited in the primary coil part and the secondary core part (ferrite material as a shielding member) excited in the secondary coil part when the distance between the primary coil part and the secondary coil part, namely, the air gap, was 1 mm, as illustrated in FIG. 12A. Here, considering that the frequency of the alternating current used in an inverter of an electric vehicle is 20 kHz, it was analyzed that the alternating current was 20 kHz, and the results are shown in the table of FIG. 14.

FIGS. 13(*a*) through (*d*) illustrate the distribution of magnetic flux for each case when the air gap (the distance between the opposing primary and secondary coils) of the primary coil part and the secondary coil part in the same configuration as FIG. 12(*a*) was 1 mm, 2 mm, 3 mm, and 4 mm, respectively. FIG. 14 is a table showing simulation values of the graphic results illustrated in FIGS. 12 and 13.

Referring to FIG. 14, it can be seen that although the coupling coefficients of the rotary transformer decrease as the air gap increases, unlike the previous simulation results (see FIG. 8, the simulation results of the conventional rotary transformer having the structure that two coils face each other with the air gap), the change (decrease volume) in the coupling coefficients is relatively small. In other words, it means that the rotary transformer can be configured for all air gaps in the same configuration as the present invention.

Figure 15A:
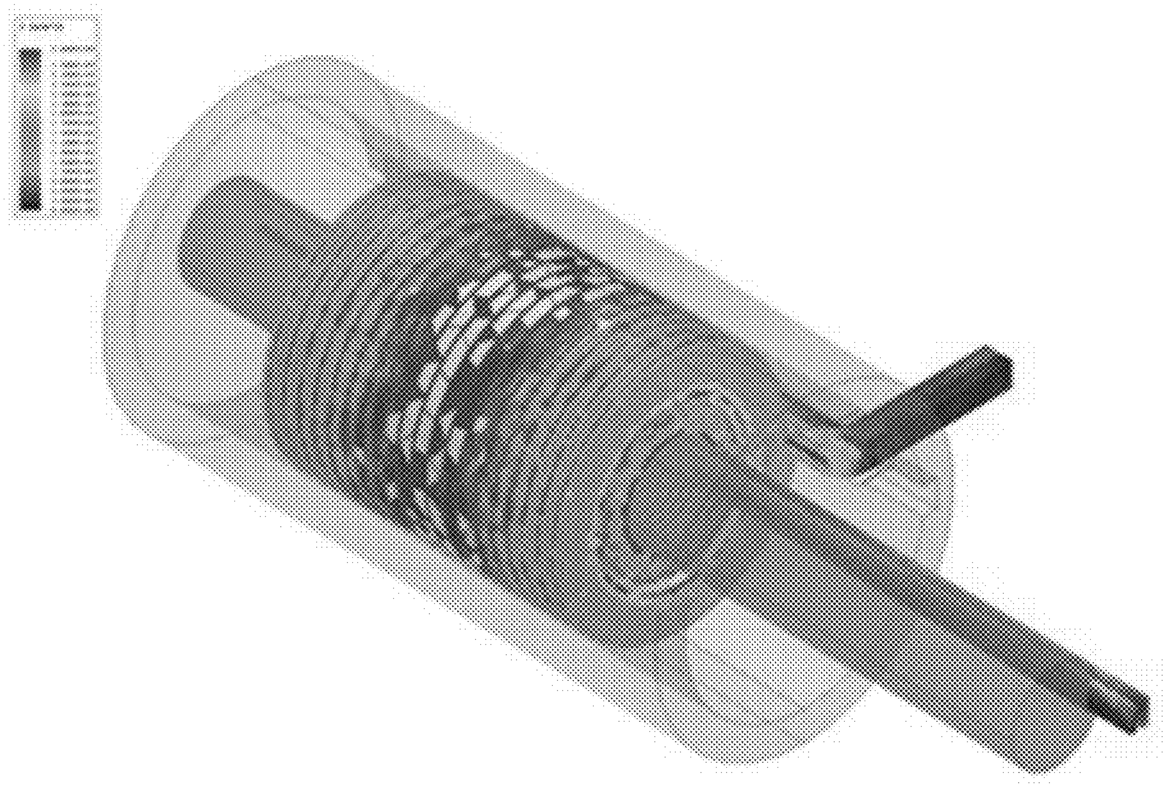
FIGS. 15 and 16 are graphic views showing simulation results when a core part is made of stainless steel, instead of ferrite core, in the rotary transformer having the structure that two coils are concentrically arranged inside a motor shaft.
Figure 15B:
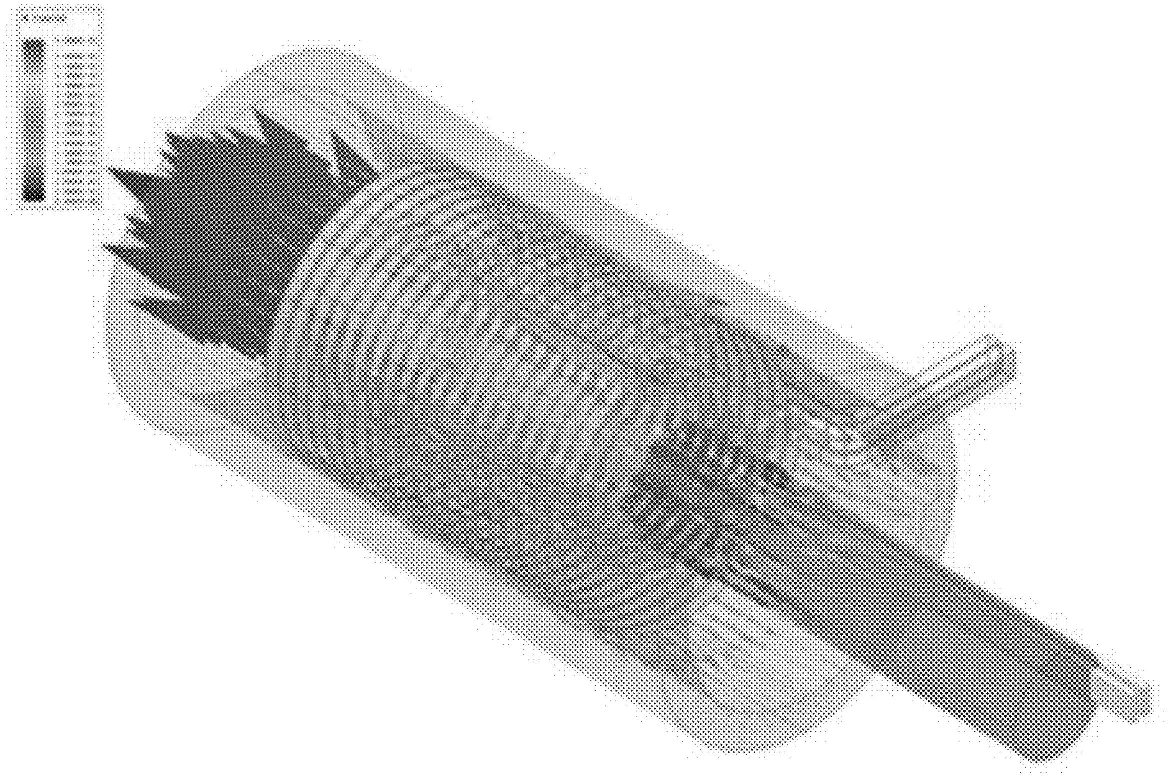
Figure 16A:
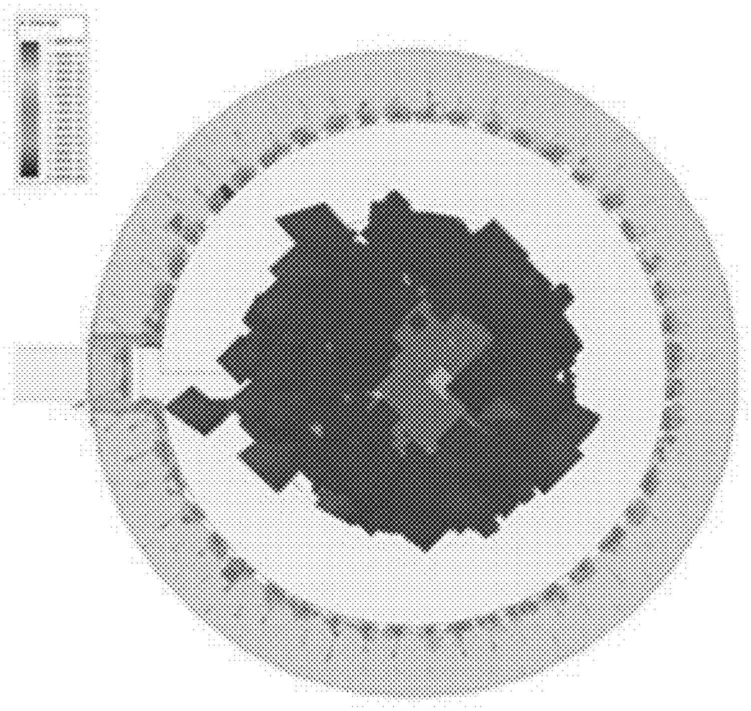
Figure 16B:
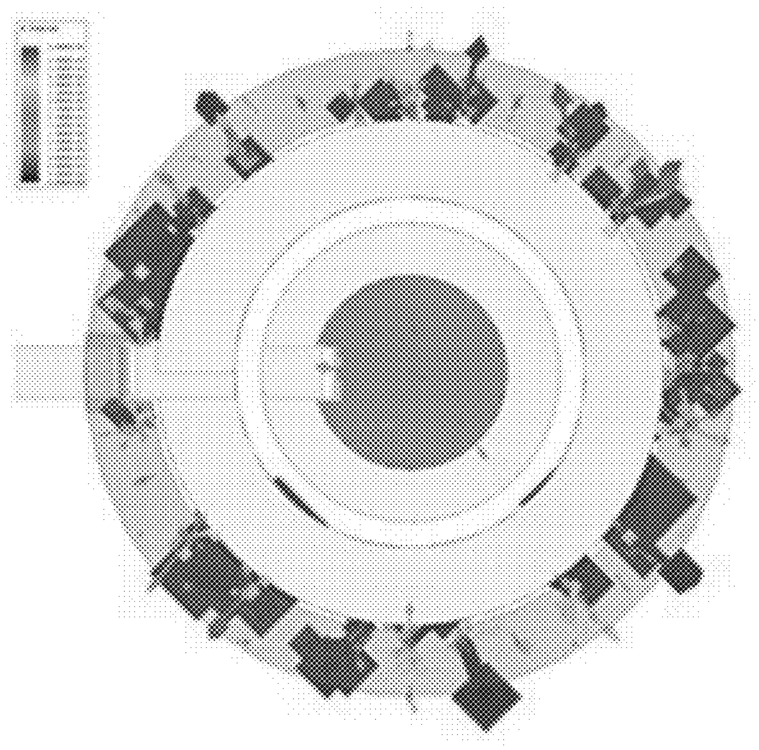
Figure 16C:
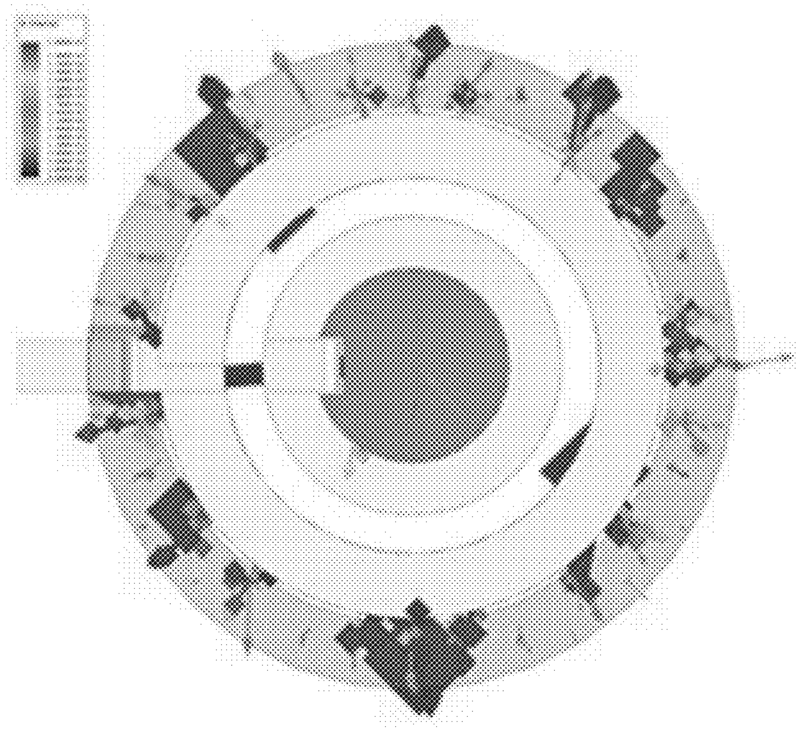
Figure 16D:
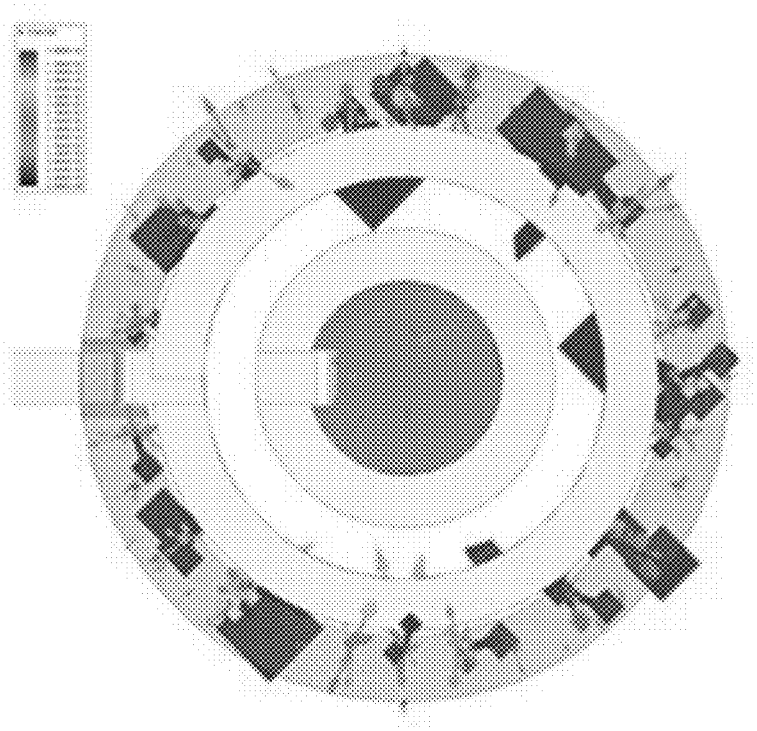

FIGS. 15 and 16 also depict simulation results for a rotary transformer with a configuration similar to an embodiment of the present invention, where two coils are concentrically arranged inside the motor shaft. Unlike previous simulations, these FIGS. show the results when the primary core part is replaced with stainless steel.

FIG. 15(*a*) shows the simulation results indicating the density of alternating currents in the primary coil part and the secondary coil part when the distance between the primary coil part and the secondary coil part of the rotary transformer according to an embodiment of the present invention was 1 mm. Considering that the frequency of the alternating current used in an inverter of an electric vehicle is 20 kHz, it was analyzed that the alternating current was 20 kHz, and the results are shown in the table of FIG. 8.

FIG. 15(*b*) shows the magnetic flux between the primary core part (stainless steel) excited in the primary coil part and the secondary core part (hollow motor shaft made of stainless steel) excited in the secondary coil part when the distance between the primary coil part and the secondary coil part, namely, the air gap, was 1 mm, as illustrated in FIG. 15A.

Here, considering that the frequency of the alternating current used in an inverter of an electric vehicle is 20 kHz, it was analyzed that the alternating current was 20 kHz, and the results are shown in the table of FIG. 17.

FIGS. 16(*a*) through (*d*) illustrate the distribution of magnetic flux for each case when the air gap (the distance between the opposing primary and secondary coils) of the primary coil part and the secondary coil part in the same configuration as FIG. 12A was 1 mm, 2 mm, 3 mm, and 4 mm, respectively. FIG. 17 is a table showing simulation values of the graphic results illustrated in FIGS. 15 and 16.

Referring to FIG. 17, it can be seen that the coupling coefficients of the rotary transformer decrease as the air gap increases, and compared with the previous simulation results (the simulation results of the case that the primary core part is formed of the ferrite core and the secondary core part is formed of ferrite), the change (decrease volume) in the coupling coefficients is not significant.

In other words, unlike the conventional structure that two coils face each other, in the structure of the present invention that two coils (primary and secondary coil parts) are concentrically arranged, the change (decrease volume) in the coupling coefficients is minimal even when the primary core and the secondary core are made of stainless steel. Accordingly, it is clearly confirmed that there is no matter when the rotary transformer is formed with stainless steel cores.

Figure 18:
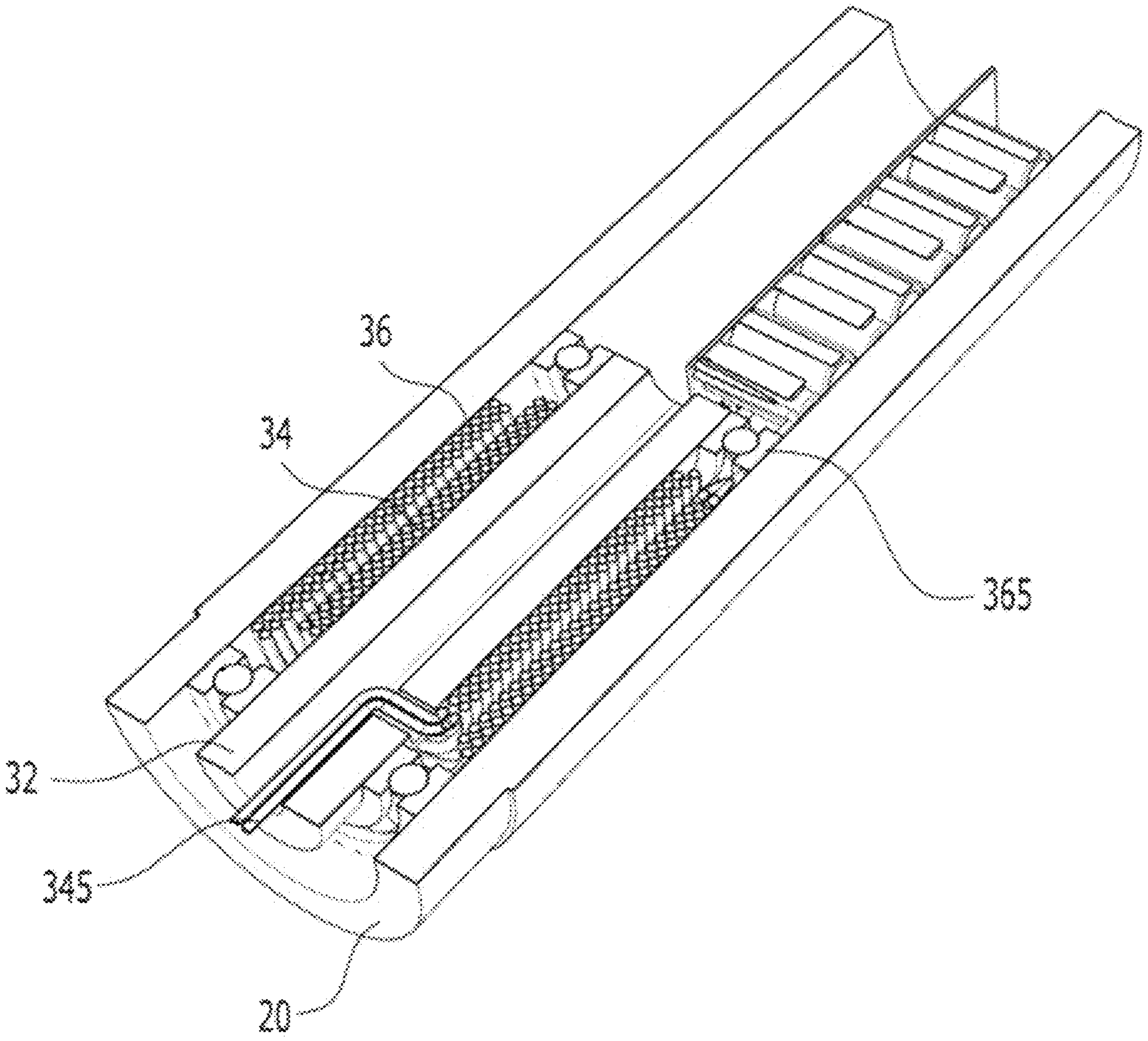
FIG. 18 is a sectionally perspective view illustrating a non-contact rotary transformer according to another embodiment of the present invention.
Figure 19:
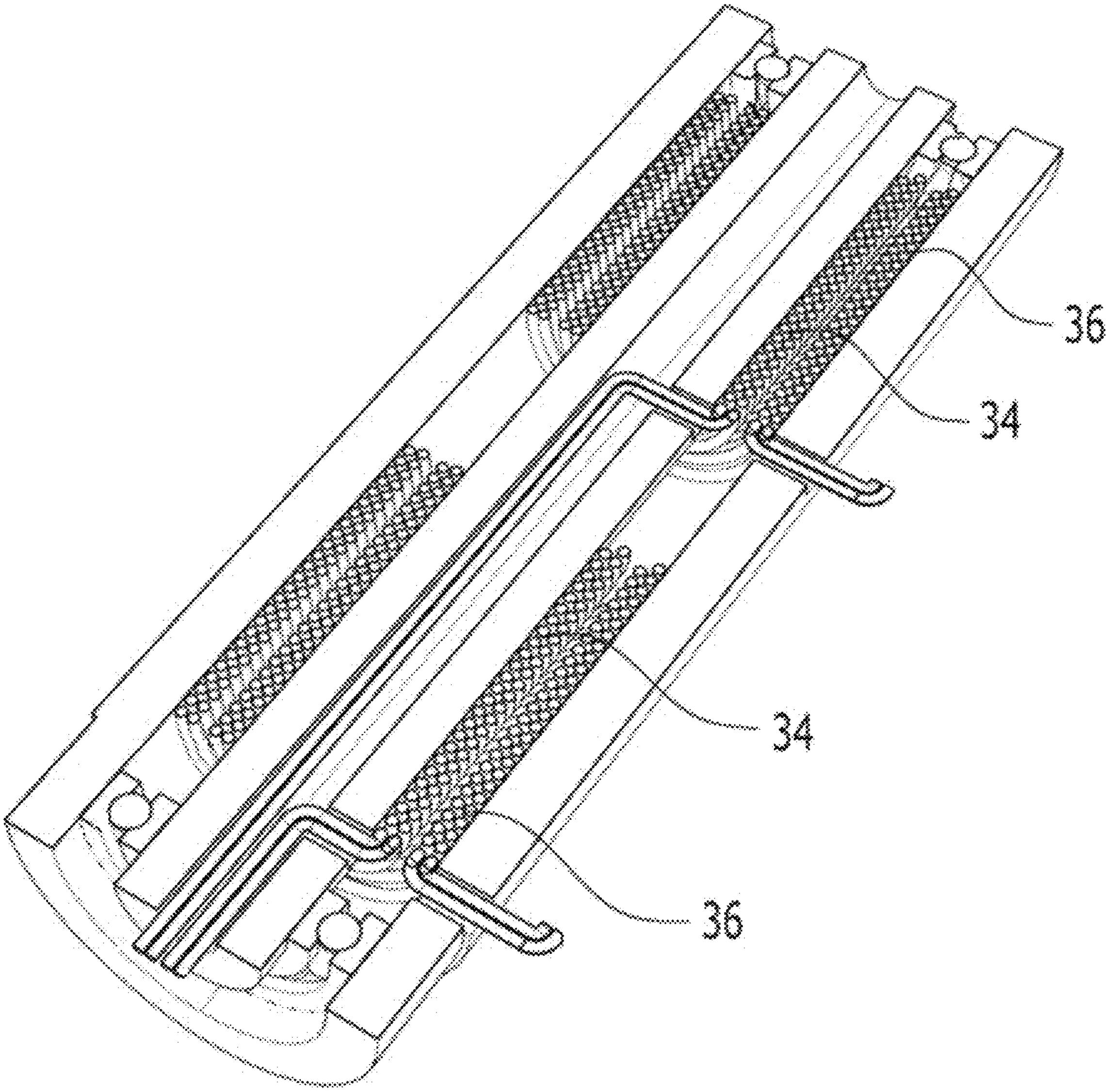
FIG. 19 is a sectionally perspective view illustrating a non-contact rotary transformer according to a further embodiment of the present invention.

Meanwhile, FIGS. 18 and 19 are sectionally perspective views of a non-contact rotary transformer according to another preferred embodiment of the present invention. Unlike the previous embodiment where only the rectifier circuit part is located outside the motor shaft, in FIG. 18, the core part 32, the primary coil part 34, the secondary coil part 36, and the rectifier circuit part 38 are also embedded inside the hollow motor shaft 20, and in FIG. 19, a plurality of coil groups are configured inside the hollow motor shaft 20.

In the embodiment illustrated in FIG. 18, the core part 32 is formed as a hollow tube, such that the power input terminal 345 of the conductive cable of the primary coil part 34 passes through the inside of the core part 32 and is induced to the position where the primary coil part 34 is formed and the power output terminal of the secondary coil part 36 passes through the outer race of the rear bearing B2 and is electrically connected to the rectifier circuit part 38 at the rear.

In the embodiment illustrated in FIG. 18, since the coil part and the rectifier circuit part of a rectifier are embedded within the hollow motor shaft, the wound rotor synchronous motor can be manufactured in a more robust and compact design. Moreover, compared with the embodiment having the rectifier circuit part positioned on the outside of the motor shaft, the rectifier circuit part illustrated in FIG. 18 is less affected by rotational inertia, thereby lowering the possibility of component damage, and simplifying control of the rectifier circuit.

In addition, as illustrated in FIG. 19, when a plurality of coil groups are configured in a single core part, namely, when two or more primary coil parts 34 are provided and secondary coil parts 36 are configured to correspond to each of the two or more primary coil parts 34, the configuration can double the power supplied to the rotor per unit time compared to the configuration with a single coil group, so can be usefully utilized in high-performance wound rotor synchronous motors that require high output.

According to embodiments of the present invention, the non-contact rotary transformer and the motor comprising the same can realize the electrical connection between the external power source and the rotor with a wider air gap (distance between two coils) than that of the conventional technology having the coils facing each other, and can significantly improve durability of the motor since the structural design significantly reduces the possibility of physical contact and damages between the coils.

Moreover, when the same metal material as the motor housing and and the motor shaft, such as stainless steel, instead of structurally fragile ferrite is used for the core, it does not significantly affect the change (decrease volume) in the coupling coefficient, which is characteristics indicating transformer efficiency. In other words, the non-contact rotary transformer and the motor comprising the same use stainless steel instead of ferrite, which is less durable, for the cores, thereby enhancing durability and reliability of the motor.

Furthermore, the non-contact rotary transformer and the motor comprising the same can reduce costs and realize the motor at a more economical cost since stainless steel is relatively cheaper than ferrite, thereby increasing price competitiveness.

In addition, as most or all components of the rotary transformer are installed inside the hollow motor shaft, the size of the motor can be significantly reduced compared to that of the conventional wound rotor synchronous motor which has the rotary transformer mounted on the exterior of the motor shaft, thereby responding to the market demands for miniaturization, facilitating control by reducing the rotational inertia of the rotor, and eliminating the complexity of needing additional balancing members to address mass imbalance in the rotation direction of the rotor.

The detailed description above has only described particular embodiments. However, it should be understood that the present invention is not limited to the specific forms set forth herein. Rather, it is to be construed that the present invention includes all the changes, equivalents, and substitutions falling within the spirit and scope of the invention as defined by the appended claims.

[Description of Symbols]

| | |
|---|---|
| 1: motor | 10: motor housing |
| 12: stator | 20: motor shaft |
| 21: front bearing | 22: rotor |
| 23: rear bearing | 28: metal receptor |
| 30: rotary transformer | 32: core part |
| 33: groove (groove through which power input terminal passes) | |
| 34: primary coil part | 36: secondary coil part |
| 37: shielding member | 38: rectifier circuit part |
| 345: power input terminal | 365: power output terminal |
| B1: front bearing | B2: rear bearing |

What is claimed is:

1. A non-contact rotary transformer, which is a device for connecting a rotor of a motor to an external power source in a non-contact manner, comprising:

a core part arranged inside a hollow motor shaft in a coaxial structure with the motor shaft;

a primary coil part installed on the outer circumferential surface of the core part;

a secondary coil part installed on an inner circumferential surface of the motor shaft and surrounding the primary coil part at a predetermined interval (air gap) therefrom; and a rectifier circuit part coupled to the motor shaft, rotating in synchronization with the motor shaft, and electrically connected to the secondary coil part, wherein the core part is installed inside the motor shaft through one or more internal bearings such that the core part and the primary coil part are free from the rotation of the motor shaft, wherein the secondary coil part installed on the inner circumferential surface of the motor shaft performs a rotational motion in synchronization with the motor shaft, and wherein the rectifier circuit part is electrically connected to the rotor of the motor to supply power to the rotor.

2. The non-contact rotary transformer according to claim 1, wherein the internal bearings include:

a front bearing installed between the motor shaft and the core part in front of the primary and secondary coil parts; and a rear bearing installed between the motor shaft and the core part behind the primary and secondary coil parts.

3. The non-contact rotary transformer according to claim 1, wherein a hole or a groove for inducing a cable of the primary coil part from the outside to the inside of the motor shaft is formed on the central part or the outer surface of the core part.

4. The non-contact rotary transformer according to claim 1, wherein a shielding member for magnetic shielding is installed between the secondary coil part and the motor shaft.

5. The non-contact rotary transformer according to claim 1, wherein the core part is made of magnetic material and is formed in a round bar shape.

6. The non-contact rotary transformer according to claim 5, wherein the core part is made of stainless steel.

7. The non-contact rotary transformer according to claim 1, wherein the rectifier circuit part is installed outside the motor shaft.

8. The non-contact rotary transformer according to claim 7, wherein the rectifier circuit part is accommodated in a metal receptor coupled to the outer circumferential surface of one end of the motor shaft, and the metal receptor is made of aluminum.

9. The non-contact rotary transformer according to claim 1, wherein the rectifier circuit part is installed inside the motor shaft.

10. The non-contact rotary transformer according to claim 1, wherein two or more said primary coil parts are provided, and wherein secondary coil parts are configured to correspond to each of the two or more primary coil parts.

11. A motor comprising:

a motor housing;

a hollow motor shaft rotatably supported at the center of the motor housing;

a stator coupled inside the motor housing;

a rotor coupled to the motor shaft, and generating rotational force for rotating the motor shaft by interaction with the stator; and a non-contact rotary transformer installed in the hollow motor shaft as described in claim 1.

* * * * *